United States Patent [19]

Ohnstein

[11] Patent Number: 5,244,537

[45] Date of Patent: Sep. 14, 1993

[54] FABRICATION OF AN ELECTRONIC MICROVALVE APPARATUS

[75] Inventor: Thomas R. Ohnstein, Roseville, Minn.

[73] Assignee: Honeywell, Inc., Minneapolis, Minn.

[21] Appl. No.: 949,312

[22] Filed: Sep. 22, 1992

Related U.S. Application Data

[62] Division of Ser. No. 636,965, Jan. 2, 1991, Pat. No. 5,180,623.

[51] Int. Cl.⁵ ............... H01L 21/306; B44C 1/22; C03C 15/00; C23F 1/00
[52] U.S. Cl. ................... 156/643; 156/644; 156/647; 156/653; 156/656; 156/657; 156/659.1; 156/662
[58] Field of Search ............... 156/643, 652, 653, 656, 156/657, 659.1, 662, 644, 647; 346/140 R; 29/621.1

[56] References Cited

U.S. PATENT DOCUMENTS

| | | | |
|---|---|---|---|
| 4,581,624 | 4/1986 | O'Connor | 156/644 X |
| 4,770,740 | 9/1988 | Tsuzuki et al. | 156/644 |
| 4,966,646 | 10/1990 | Zdeblick | 156/644 X |

*Primary Examiner*—William A. Powell

[57] ABSTRACT

An electronic microvalve design and fabrication process for a miniature gas valve. In this microvalve design an objective is to minimize the operating voltage of the valve and minimize the force necessary to close the valve and hold it tightly closed against high gas pressures. The microvalve is an integral structure made on one piece of silicon and is a flow through valve with inlet and outlet on opposite sides of the silicon wafer.

3 Claims, 7 Drawing Sheets

FABRICATION OF AN ELECTRONIC MICROVALVE APPARATUS

This application is a division, of application Ser. No. 07/636,965 filed Jan. 2, 1991, U.S. Pat. No. 5,180,623.

BACKGROUND AND SUMMARY OF THE INVENTION

1. Field of the Invention

This present invention relates to an electronic silicon based microvalve which is an integral structure made on one piece of silicon and is a flow through valve with inlet and outlet on opposite sides of the silicon wafer. The closure plate of the microvalve can be in the form of a cantilever, a beam attached at two sides, or a diaphragm attached at four sides with flow holes through the diaphragm.

In the prior art there are other types of microvalves including one in which a miniature valve is fabricated from two micromachined pieces of material which must be assembled after processing. Another miniature valve has an enclosed chamber with flow inlet and flow outlet on the same side of a silicon wafer.

In the present invention the miniature valve is made on a single piece of silicon and is a flow through valve with a flow inlet and a flow outlet on opposite sides of the silicon wafer. This is a miniature integral thin film bleed valve in which the closure plate or member surface conforms to the surface of the valve orifice plate or member. The valve closure plate of this invention has flow holes through the plate, the holes being near but laterally displaced from the valve orifice that reduce the effective area the gas pressure is pushing against when closing, making it easier to close the valve.

BRIEF DESCRIPTION OF THE DRAWINGS

FIG. 2a shows the microvalve in the energized closed position and FIG. 2b shows an enlarged section of a portion of FIG. 2a.

FIG. 3b shows an enlarged section of a portion of FIG. 3a.

DETAILED DESCRIPTION

Electrostatically operated bleed valves depend on extremely close spacings between the valve seat member electrode and the closure member electrode over an area substantially broader than the flow orifice to obtain effective closures against high fluid pressures if excessive operating voltages are to be avoided. For homogeneous dielectrics between electrodes, the electrostatically generated force increases inversely with the square of the separation distance. Therefore a lack of matching of the two electrode surfaces that may arise from differences of curvature, irregular surfaces, or warping can degrade the valve performance. In particular, the use of a raised seat can seriously affect the performance in that the standoff effect of the seat prevents the closest approach of the two electrodes in the area surrounding the seat. Moreover, any bimorph bending effect due to asymmetry in the thickness properties of the closure member may prevent complete closure at normal applied voltages.

This invention avoids or minimizes these difficulties by fabricating the device by means of one integral operation by depositing and delineating a set of stacked thin film layers such that separate handling of any part of the structure is never required. This method of fabrication enables the use of a conformal structure for the electrode members that is obtained by etching out an extremely thin sacrificial layer of uniform thickness such that any shape irregularity on the lower electrode member surface is matched by its negative image on the upper electrode member surface. Hence the surfaces fit together in closure after etching. The exposed member surfaces are composed of chemically inert, high quality silicon nitride which is not significantly attacked by the etchant.

In addition, the invention uses closure member area shapes and thin dimensions, one micron thick or less, that allow flexing mainly at the edges when in the closed position, thus enabling conformal closure over all of the closure member's main area even for moderate asymmetry in the thickness properties of the closure member. An additional advantage of this invention is that the pneumatic force on the closure member when closing and when in the closed position can be minimized, if desired, by the use of flow-through holes located in the closure member adjacent to the valve orifice holes.

Figure 1A:
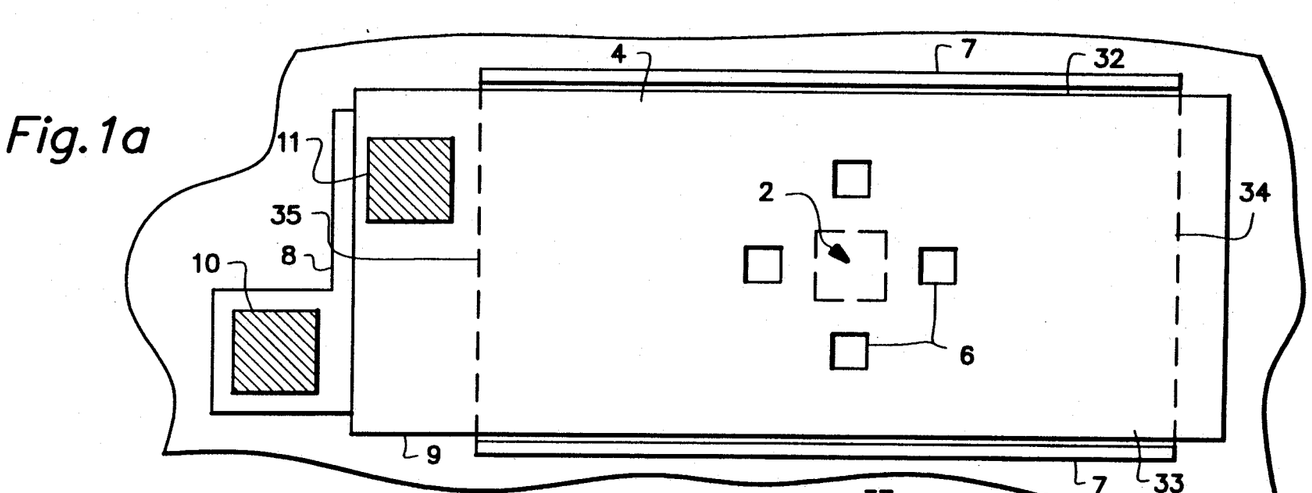
FIGS. 1a and 1b are a top plan view and a cross section view of one preferred embodiment of the electronic microvalve according to the invention and is shown in the normally open unenergized position.
Figure 1B:
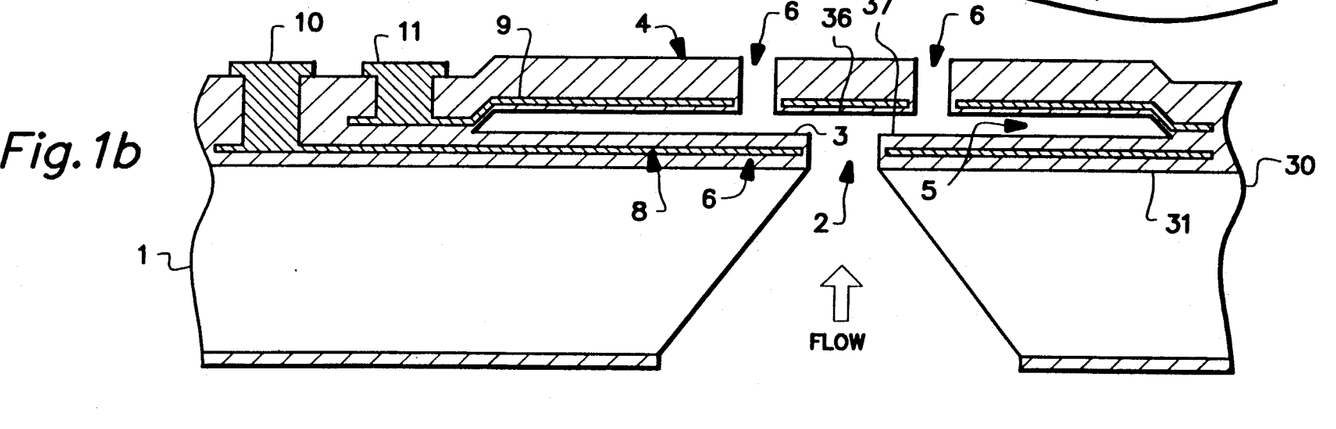

Referring now to the drawings FIG. 1a is a top plan view of a preferred embodiment of the microvalve shown more clearly in the sectional view of FIG. 1b. A substrate 1 is preferably of single crystal silicon in which a wafer has been cut from a single crystal boule. Multiple valves may be simultaneously made in the same wafer if desired, and later separated, as is common in semiconductor chip technology. The miniature valve includes broadly the following major components; an inlet orifice 2 which is formed by etching through the substrate 1 from the backside, a valve base plate 3, which is part of a thin film dielectric layer means 30, preferably of silicon nitride, ($Si_3N_4$), formed on the surface 31 of the silicon substrate 1, a dielectric closure plate 4, that is a thin free standing flexible dielectric region that has been released from the main body of layer means 30 by the removal of a sacrificial film, leaving a thin gap 5 between the closure plate 4 and the base plate 3. The closure plate 4 contains one or more flow-through outlet holes 6 adjacent to the inlet orifice 2 but laterally offset from the orifice. Four such adjacent flow-through holes 6 are shown in FIG. 1a for illustrative purposes, but the number of holes is not critical. The total area of the outlet holes 6 is preferably designed to be equal to or larger than the area of the orifice 2. Outlet flow slots 7 formed along two sides 32 and 33 of the closure plate 4 leave the closure plate attached to the rest of the structure on two sides generally indicated at 34 and 35. As a general rule the area of the closure plate 4 is designed to be 10–100 times the area of the orifice. Embedded in the base plate 3 is electrode 8 and embedded in the closure plate 4 is an electrode 9. The lower electrode 8 is completely encapsulated by dielectric to electrically isolate it from the silicon substrate 1 and the upper electrode 9. The upper electrode 9 is completely encapsulated by the dielectric layers that form the closure plate to electrically isolate it from the lower electrode. Electrical connections 10 and 11 are made to the lower and upper electrodes by metal pads built up through vias to form a lower connection pad 10 and an upper connection pad 11.

Figures 2A, 2B:
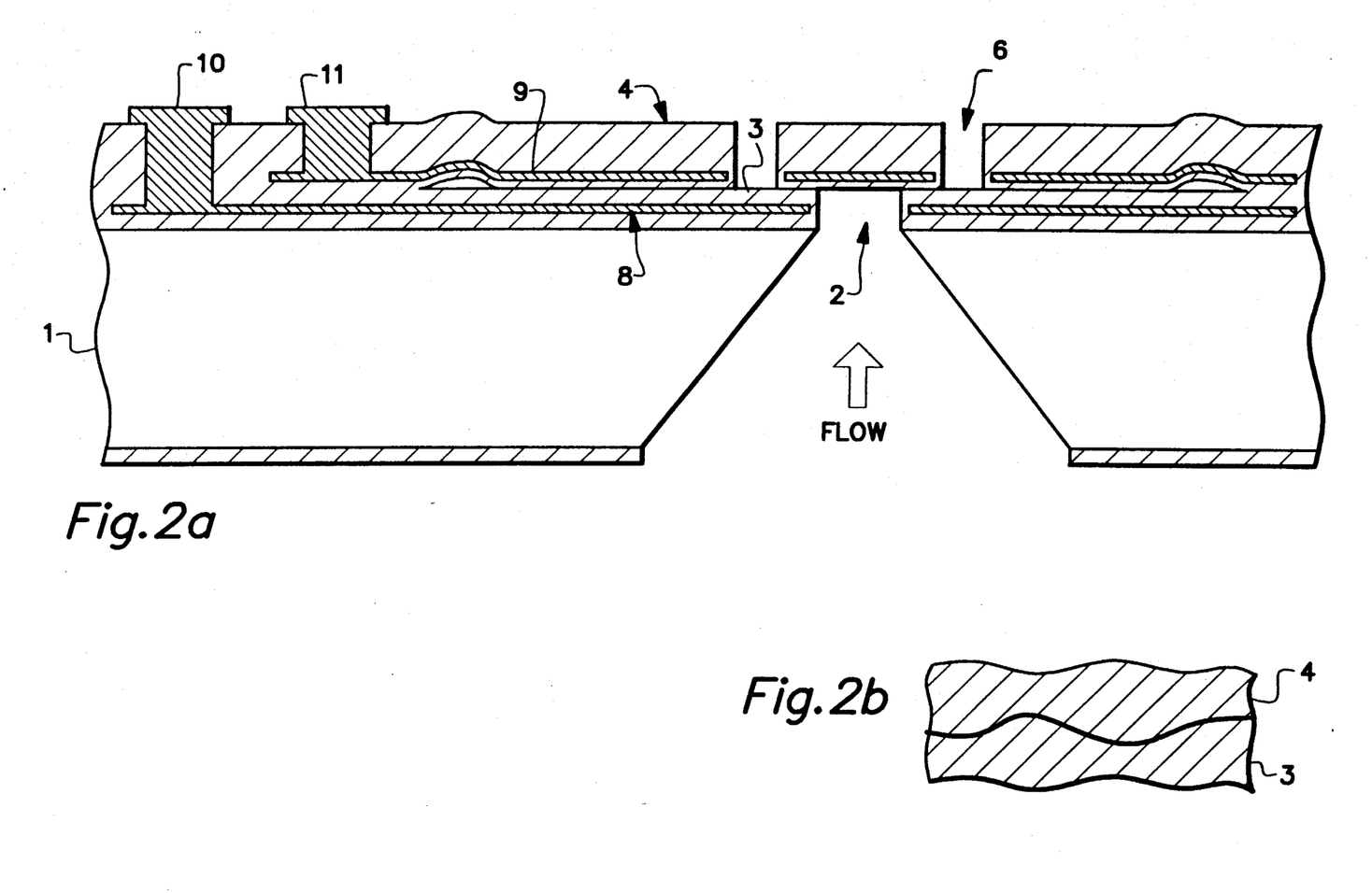

FIG. 1b is shown in the unenergized normally open position. FIG. 2a shows the same embodiment of the valve as is shown in FIG. 1b, but FIG. 2a shows the valve in the closed position. When the valve as shown in FIG. 1b is to be energized to close the valve, the surface 36 of closure plate 4 will move down to touch surface 37 of base plate 3.

The operation of the miniature valve is as follows, now referring to FIGS. 1 and 2. When the valve is in a normally open, that is, an unenergized state, as in FIG. 1 with no voltage applied to the electrodes 8 and 9, gas enters the valve through the inlet orifice 2 and flows through the valve and exits through the outlet orifice holes 6 in the closure plate 4 and the outlet holes 7 along the sides of the closure plate. When a voltage is applied between the upper electrode plate 9 and lower electrode plate 8 at the contact pads 10,11 there is an electrostatic force between the electrode plates that is directly proportional to the square of the applied voltage that will pull the closure plate 4 against the valve base plate 3 as illustrated in FIG. 2a and stop the flow of gas through the valve. FIG. 2b is an enlargement of a section of the mating or opposing surfaces 3 of the base plate 3 and the closure plate 4. It shows that closure plate 4 and the base plate 3 will fit together with conformal surfaces. Because the valve is made by a succession of thin film depositions any surface irregularities or asperities in the silicon substrate or any film depositions will be replicated throughout subsequent film depositions. Therefore referring to FIG. 1b, when the thin sacrificial layer is removed leaving the gap 5, the top surface of the base plate 3 will be mirror imaged in the bottom surface of the closure plate 4, so that when the two surfaces are pressed together in the closed position of the valve as in FIGS. 2a and 2b there will be a conformal mating of the closure plate 4 and base plate 3 surfaces giving tight sealing of the valve over the majority of the area of the closure plate 4.

The valve may be operated as a two position valve with fully open and fully closed positions by applying a d.c. voltage between the electrodes or it may be operated as a proportional control valve by applying a voltage proportional to the voltage necessary to close the valve. It may also be operated with a pulse width modulated voltage signal to modulate the gas flow through the valve.

Figure 3A:
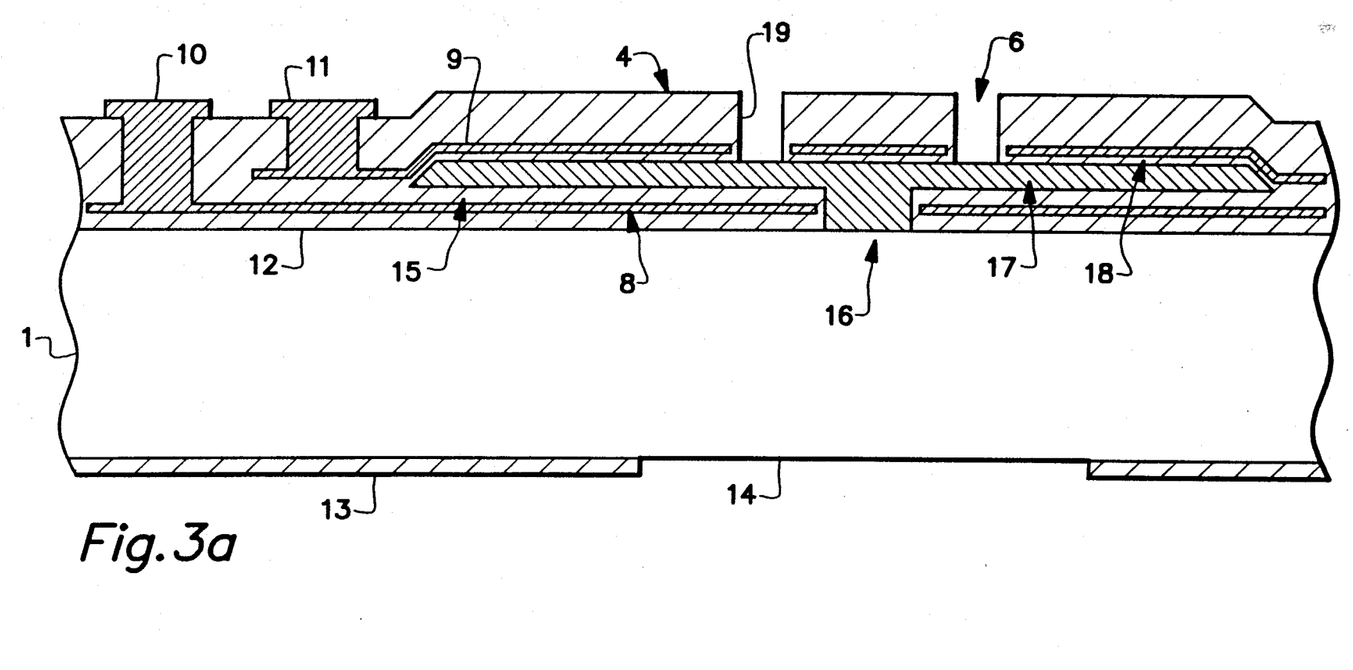
FIG. 3a shows the microvalve at an earlier or intermediate stage of fabrication while the sacrificial layer is in place and before selective etching has been commenced.

The fabrication of the miniature valve will be described using FIGS. 3a, 3b and 1b. FIG. 3a illustrates a valve with all of the thin film layers deposited and patterned but the final etching has not yet been performed. The fabrication sequence begins with a (100) silicon wafer 1 that has both sides polished to a semiconductor device-quality mirror finish. A silicon nitride film 12 is deposited on the front side of the wafer to passivate the surface and electrically isolate the lower electrode 8 from the silicon wafer 1. Another silicon nitride film 13 is deposited on the backside of the wafer to passivate the back surface of the wafer and protect it during the final etching steps or the processing. The backside silicon nitride film 13 is patterned to form the backside inlet orifice opening 14 which will be etched later in the processing. A metal film is then deposited and patterned on the frontside of the wafer to form the lower electrode 8, and it is then passivated by a silicon nitride film 15. The silicon nitride film on the frontside is then patterned and etched to open a via to the silicon surface 16. This via pattern 16 defines the frontside of the inlet orifice. The via is formed using a plasma etch.

A thin film of material is then deposited and patterned that will serve as a sacrificial layer 17 that will be removed later in the processing. This sacrificial layer 17 serves as a spacer between the valve base plate 3 and the valve closure plate 4 so that when it is removed later in the process, the closure plate 4 will be released and free to move. The sacrificial layer 17 can be any material, a metal or an insulator that can be deposited in thin layers, patterned, and later removed with an etch that does not attack any of the other films that would be exposed at the time of the etching. Examples of sacrificial layers that can be used are aluminum or silicon dioxide. Each of these materials can be removed using an etch that will not attack the silicon nitride layers used in the valve structure or any of the other metals used in the contacting pad areas 10 and 11. A thin layer of silicon nitride 18 is deposited over the sacrificial layer to form the bottom layer of the valve closure plate 4 and to provide passivation of the upper electrode and to electrically isolate the upper electrode 9 from the bottom electrode 8.

Figure 3B:
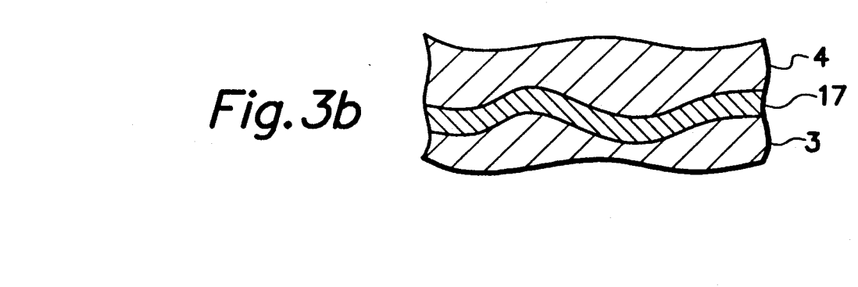

FIG. 3b illustrates the conformal nature of the film depositions described previously through an illustrative enlargement of the film interfaces on either side of the sacrificial spacer layer 17. Any surface irregularities are transmitted up and replicated through subsequent film depositions. This results in conformal mating surfaces between the valve base plate 3 and the valve closure plate 4 after the removal of the sacrificial layer 17.

In FIG. 3a a metal layer is then deposited and patterned to form the upper electrode 9. A silicon nitride layer 19 is then deposited over the upper electrode 9 to passivate the electrode and finish the formation of the closure plate 4. This silicon nitride layer 19 is typically a thicker film than the layer 18 under the upper electrode 9 to give the closure plate 4 added strength when the sacrificial layer 17 is removed. The total thickness of the closure plate 4, made up of the nitride layers 18 and 19 and the upper electrode 9, is typically in the range of 1 to 1.5 microns. The silicon nitride films 18 and 19 that make up the closure plate 4 are deposited in a stress controlled manner such that when the closure plate is released from the substrate structure by the removal of the sacrificial layer 17, the closure plate 4 remains flat and free from any buckling or warping to preserve the conformal mating surfaces of the closure plate 4 and the valve base plate 3.

The outlet flow openings 6 and 7 are formed by etching vias through the closure plate 4 using a dry plasma etch. These flow holes also act as access vias for the introduction of an etchant for the removal of the sacrificial layer during the final etching steps. Now referring again to FIG. 1b, the fabrication of the valve is completed by anisotropically etching the silicon wafer in KOH to form the inlet port 2. The sacrificial layer, 17 in FIG. 1, is then removed using a etch selective to the sacrificial layer material. As the sacrificial layer etch is chosen so that it will not attack the silicon nitride films, the conformal nature of the mating surfaces of the closure plate 4 and base plate 3 are preserved through the etching processes.

As an example of thicknesses of the several layers which may be used in the fabrication of the valve as shown in FIG. 3a, the silicon nitride layer 12 may be about 500 angstroms (Å), the metallic layer 8 may be about 300 angstroms, the silicon nitride layer 15 may be about 750 angstroms, the sacrificial layer 17 may be about 500 angstroms, the silicon nitride layer 18 may be about 1500 angstroms, the metallic electrode layer 9 may be about 1500 angstroms and the silicon nitride layer 19 may be about 7500 angstroms. Thus the thickness of the closure plate member may be on the order of 10,000 angstroms. These thickness dimensions are exemplary only. As an example of dimensions used in one reduction to practice of the device, according to the invention, the orifice 2 is about 35 microns on a side, and the closure plate is about 350 microns on a side.

In actuating the valve, a voltage is applied between the upper electrode 9 and the lower electrode 8. The electrostatic force between the electrodes is inversely proportional to the square of the distance between the electrodes and directly proportional to the square of the voltage applied. The distance between the electrodes is made up of the thickness of the passivating silicon nitride layer 15 over the lower electrode 8, the thickness of the silicon nitride layer 18 under the upper electrode 9 and the gap formed by the sacrificial layer 17. In order to maximize the force between the electrodes for a given operating voltage, the distance between the electrodes must be minimized. This means that the silicon nitride layers 15 and 18 and the sacrificial layer 17 must be as thin as is practical. The silicon nitride layers must provide good electrical isolation and therefore may be as thin as 500–1000 Å. The sacrificial layer may be as thin as 200 Å and may typically be in the range of 200–1000 Å.

Figure 4A:
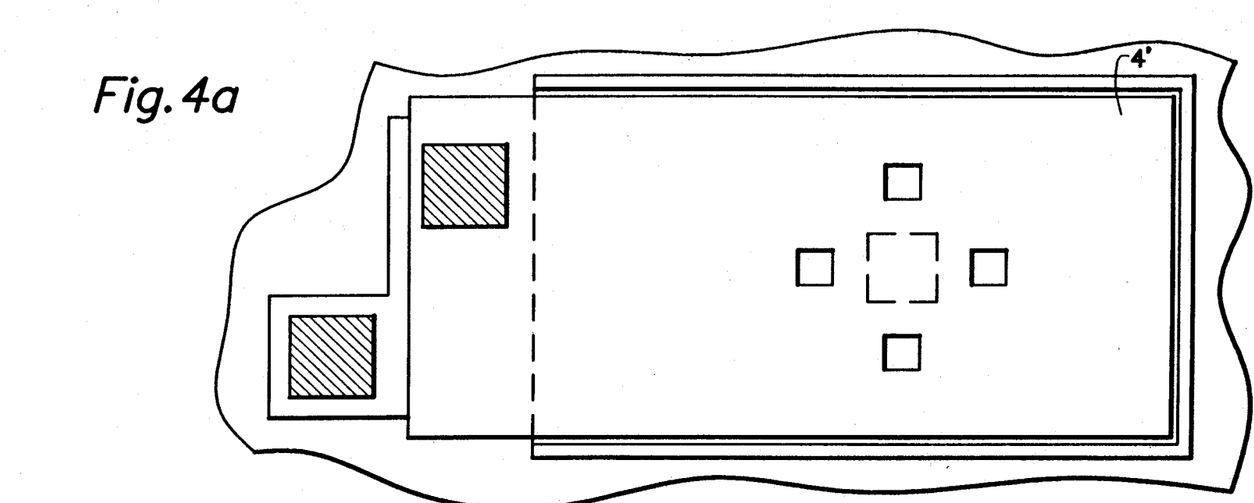
FIGS. 4a and 4b are another embodiment of the microvalve in the form of a cantilever.
Figure 4B:
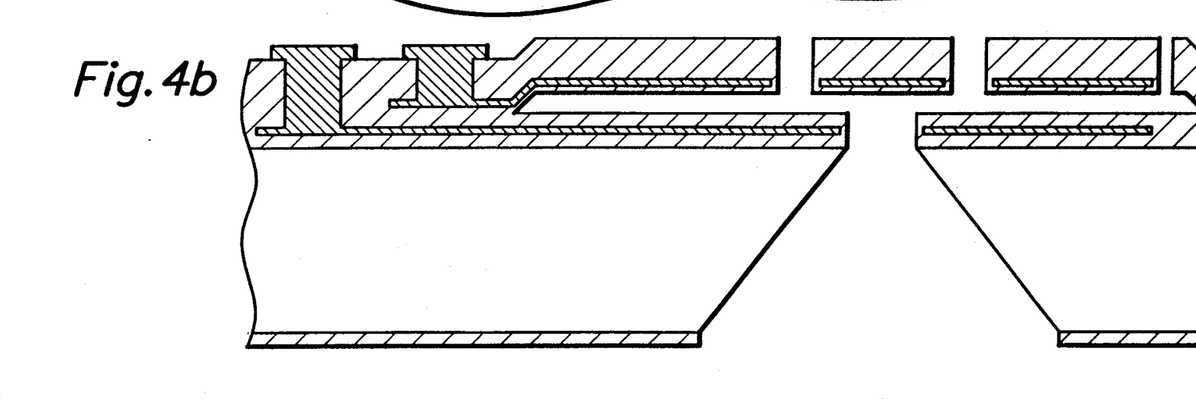
Figure 5A:
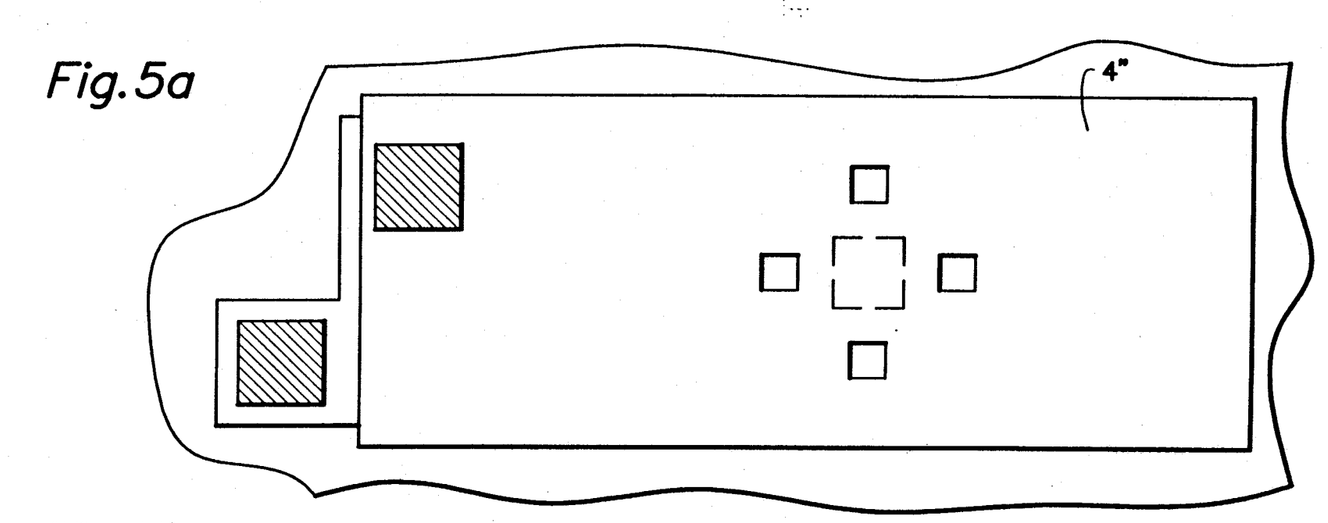
FIGS. 5a and 5b are a further embodiment of the microvalve in the form of a diaphragm.
Figure 5B:
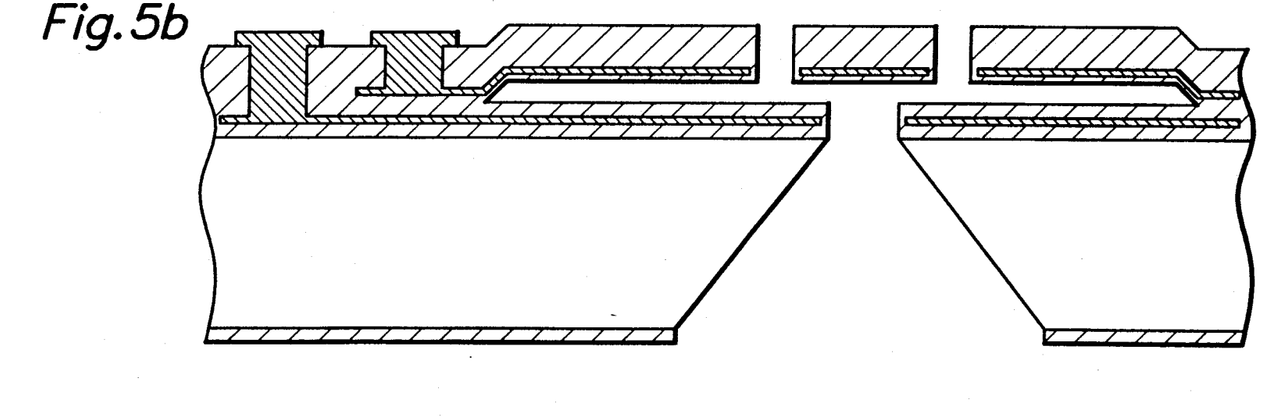
Figure 6A:
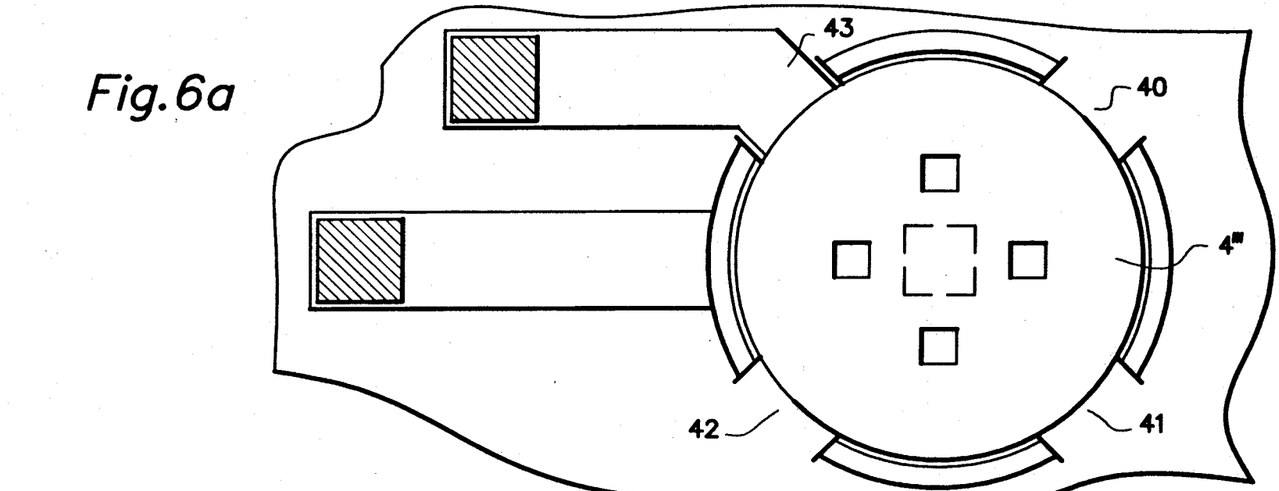
FIGS. 6a and 6b are a further embodiment of the microvalve which has a circular configuration.
Figure 6B:
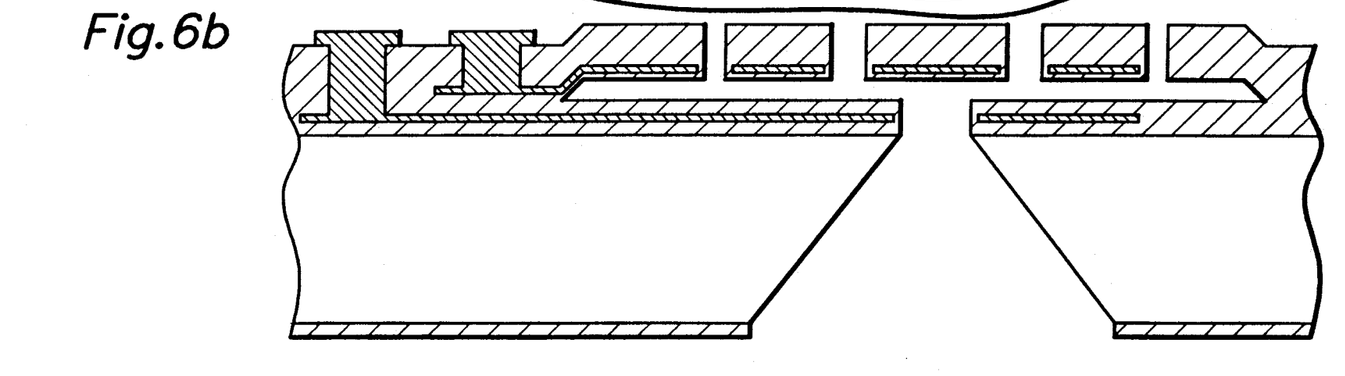
Figure 7A:
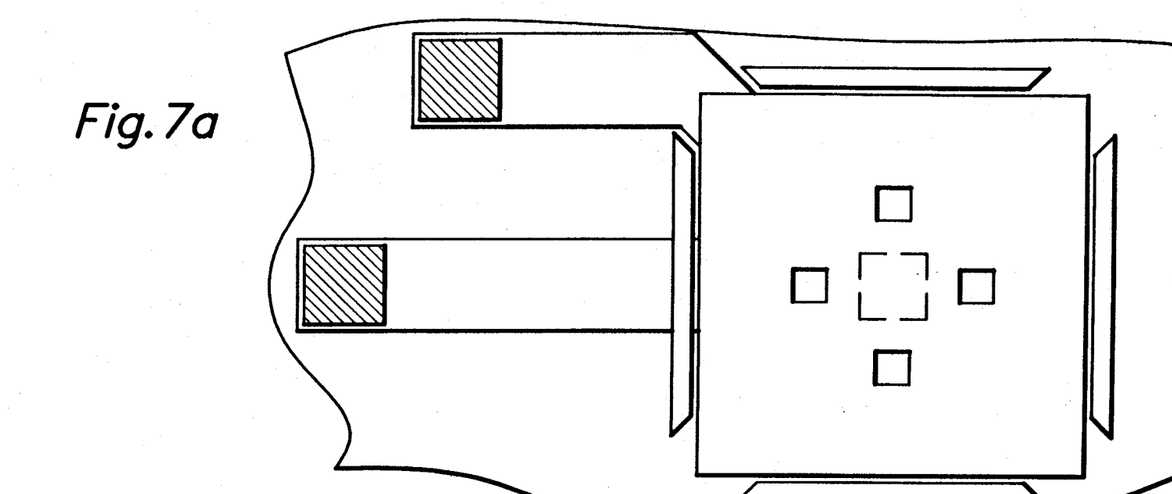
FIGS. 7a and 7b are a further embodiment of the microvalve having a square configuration.
Figure 7B:
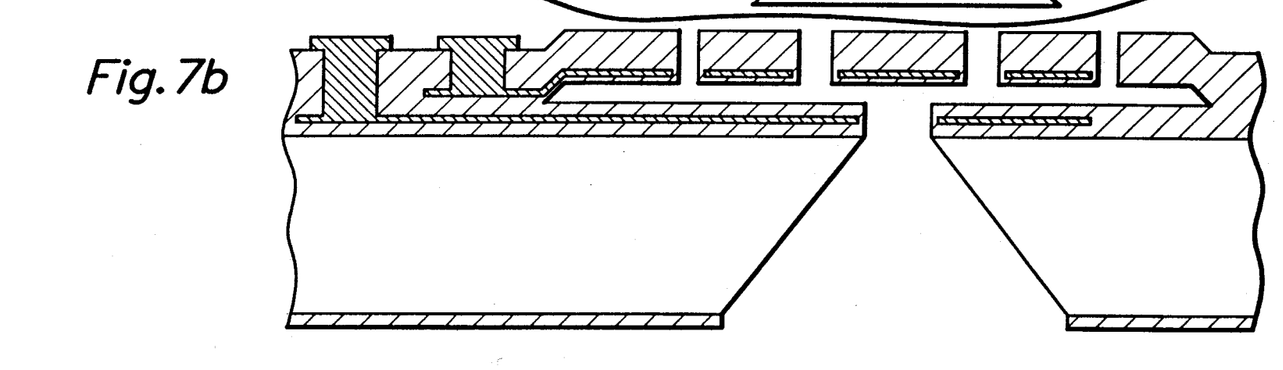

In FIG. 1a the orifice 2 and the flow holes 6 have been shown as being square, but are not intended to be limited to square. There may also be multiple flow orifices, 2's, under a closure plate; each with flow holes 6. Furthermore, it is possible to embody multiple orifice-closure plate pairs on a single silicon chip to increase the capacity of the valve to control larger flows. Also in the embodiment described so far the valve closure plate 4 is shown in the shape of a microbridge (i.e. beam attached at two ends). It is also possible to form the valve closure plate in the shape of a cantilever as is shown in FIGS. 4a and 4b where only the left end of the closure plate 4' is fastened to the rest of the valve structure. In other respects the construction and operation has been described above. FIGS. 5a and 5b show an embodiment where the closure plate 4" is fastened on all edges like a diaphragm and flow is only up through the flow holes 6. A circular embodiment is shown in FIGS. 6a and 6b where a circular closure plate 4''' is secured at locations 40, 41, 42 and 43 but otherwise operates very similar to the embodiment of FIGS. 1a, 1b, 2a, and 3a. FIGS. 7a and 7b show the microvalve having a square-shaped closure plate fastened at the four corners and otherwise being much like the valve described in detail.

I claim:

1. A process for fabricating a thin film electrostatic microvalve comprising steps of:
   providing a single crystal (100) silicon wafer having a planar surface and a backside surface;
   depositing and delineating a first thin film layer of silicon nitride on said planar surface;
   depositing and patterning a second thin film layer of silicon nitride on the backside surface, said thin film having a patterned opening to form a backside inlet orifice opening;
   depositing and delineating a thin film of metal on said first silicon nitride layer to form a lower electrode;
   depositing and delineating a third thin film layer of silicon nitride over said metal film;
   patterning and plasma etching an opening through the third and first layers of silicon nitride to the silicon planar surface at the location of the orifice through the wafer, said first and third silicon nitride layers forming a valve base plate;
   depositing in said via and depositing and patterning a thin layer of selectively etchable material over said third film of silicon nitride that will serve as a sacrificial layer that will be later removed;
   depositing and delineating over said sacrificial layer a fourth layer of silicon nitride;
   depositing and delineating a second thin film of metal on said fourth layer of silicon nitride to form an upper electrode;
   depositing a fifth layer of silicon nitride over said upper electrode to passivate the electrodes, said fourth and fifth silicon nitride layers and said upper electrode forming a valve closure member;
   forming openings through said valve closure member of silicon nitride down to said sacrificial layer, said openings forming gas outlet flow openings;
   anisotropically etching through said silicon wafer from said backside inlet orifice opening to form the inlet port; and
   providing sacrificial material selective etchant through said openings to etch and remove said sacrificial layer whereby said valve closure member is released and electrostatically operable against said valve base plate in response to an electrical potential applied to said electrodes.

2. The process according to claim 1 in which the depositing of the thin layer of selectively etchable material is to a thickness of about 500 angstroms.

3. The process according to claim 1 in which the selectively etchable material is selected from the group consisting of aluminum and silicon dioxide.

* * * * *